3,293,185
METHOD OF THAWING ICE WITH COMPOSITION CONTAINING NITRATES

William T. Curless, Overland Park, Henry L. Grimme, Jr., Wichita, and Glenn A. Terry, Prairie Village, Kans., assignors, by mesne assignments, to Gulf Oil Corporation, Pittsburgh, Pa., a corporation of Pennsylvania
No Drawing. Filed Dec. 26, 1963, Ser. No. 333,747
1 Claim. (Cl. 252—70)

This invention relates to novel thawing compositions and a method for removing ice and snow deposits from surfaces such as streets and sidewalks employing these compositions. More particularly, the method of this invention employs improved ice and snow melting compositions which may be used on surfaces adjacent to lawns and other vegetation without causing damage thereto.

Sodium chloride and 77% flake calcium chloride are the substances principally used to melt ice and snow from sidewalks, driveways, streets, etc. These compositions have the distinct disadvantage of harming vegetation when carried onto lawns by the melting ice and snow. Urea is also sold as a thawing compound, primarily for thawing ice from gutters. It has the disadvantage of being effective only at temperatures above $-11°$ C. ($+12°$ F.). Sodium chloride is effective no lower than $-21°$ C. ($-5°$ F.). Sodium nitrate occasionally sold as a thawing compound is not effective below $-18.5°$ C. ($-1°$ F.).

It has now been found that certain combinations of nitrogen-containing compounds prevent freezing of water at temperatures as low as $-40°$ C. ($-40°$ F.). A simple, economical method has been found for the preparation of compositions containing these compounds so that they possess the property of melting ice and snow at these low temperatures. Besides being effective thawing substances, these compositions, rather than destroying vegetation as do sodium chloride and calcium chloride, will act as excellent nitrogen fertilizers, thus eliminating difficulties in the destruction of vegetation near the place where they are employed.

Briefly, the method of thawing ice according to the present invention consists of applying to the surface of the ice a composition selected from solids consisting essentially of at least two compounds of the group consisting of urea, ammonium nitrate, ammonium sulfate, calcium nitrate and magnesium nitrate and liquids consisting of urea, ammonium nitrate, magnesium nitrate and calcium nitrate dissolved in at least one solvent selected from the group consisting of methanol, ethanol, propanol and isopropanol.

Improved solid thawing compositions may be prepared from combinations of nitrogen-containing compounds such as calcium nitrate, magnesium nitrate, ammonium nitrate, ammonium sulfate and urea by heating mixtures of these compounds in the form of hydrates, or with sufficient water to first form a liquid mixture at elevated temperature, preferably reducing the water content by heating, followed by cooling and solidification. The cooled solids, when broken up and sized by any convenient method, are excellent ice and snow-thawing compositions consisting for the most part of calcium and ammonium nitrates and having high nitrogen fertilizer values.

The solid thawing compositions of this invention are also made by reacting oxides or carbonates of the alkaline earth metals, e.g., CaO and MgO, or mixtures thereof, such as dolomitic lime, with nitric acid and ammonia in various ratios and evaporating excess water to give solids which when cooled, broken up, and sized are excellent thawing compositions and which possess high nitrogen fertilizer values. Graining, granulation or other known techniques may be employed to produce solid particles which have desirable properties.

It is also within the scope of this invention to prepare solid thawing compositions by the above methods with the addition of phosphorus and/or potassium values to enhance fertilizer potential; such compounds include the potassium or ammonium orthophosphates (or condensed phosphates), potassium nitrate, and potassium sulfate.

Solid thawing compositions of this invention may also be prepared by heating a mixture of ammonium sulfate (or ammonia and sulfuric acid) and urea to form a liquid mixture at elevated temperature and removing water by evaporation, if present, to form solids containing from about 50 percent to 70 percent ammonium sulfate, urea and not more than 10 percent water, which, when broken up and sized are excellent thawing compositions and which possess high nitrogen fertilizer values.

In the solid thawing compositions consisting essentially of calcium and ammonium nitrates prepared by the above methods, the preferred weight percent of calcium nitrate is from about 50 percent to about 96 percent, the remainder consisting of ammonium nitrate and not more than about 13 percent water.

Solid thawing compositions are especially advantageous for use on sloping surfaces, since they tend to remain in place until thawing occurs, providing the particles are non-spherical in shape. However, on substantially level areas liquid thawing compositions are more easily applied in a uniform concentration and present definite advantages with respect to simplicity of equipment necessary for application. It has been discovered that suitable liquid compositions may be made by dissolving at least one compound selected from the group consisting of urea, ammonium nitrate, magnesium nitrate and calcium nitrate in at least one solvent selected from the group consisting of methanol, ethanol, propanol and isopropanol. The alcohol solvent, in addition to thawing ability, acts as a carrier, since, if it should evaporate after application, a residue of ice-thawing composition will remain uniformly distributed over the treated area. A very small amount of water may be included in liquid compositions, sufficient to keep dissolved solids from precipitating on standing.

The following examples are given to illustrate the invention. It is understood that the specific proportions and conditions disclosed therein do not limit the scope of the invention.

Example 1

70 g. of calcium nitrate tetrahydrate and 30 g. of ammonium nitrate were mixed and heated to about 170° C. A solution formed on heating. The water present, from the hydrate, was removed by boiling. Final mixture temperature was 170° C. During boiling, the solution went through a pasty stage as a slurry formed and on cooling set up to a hard solid, which was broken up, sized and proved to have ice melting capacity at temperatures as low as $-35°$ C.

Example 2

Example 1 was repeated with 90 g. of calcium nitrate tetrahydrate and 10 g. of ammonium nitrate with similar results.

Example 3

A mixture of 20.2 g. calcium nitrate tetrahydrate, 31.6 g. magnesium nitrate hexahydrate and 48.2 g. of ammonium nitrate was prepared and heated to 170° C. A solution formed during the heating and boiling occurred. When boiling stopped the solution was cooled forming a solid which was crushed and sized. The composition had ice-melting capacity as low as $-40°$ C.

Example 4

A mixture of 37.5 g. urea, 45.8 g. ammonium nitrate and 16.7 g. anhydrous calcium nitrate was prepared and heated to 100° C. where a melt was formed. On cooling, the solid which formed had ice-melting capacity as low as −20° C.

Example 5

There were mixed together, 16.6 g. of calcium oxide, 153.9 g. of 55% nitric acid and 12.8 g. of ammonia and the water was removed by heating to 170° C. The solid obtained was broken up and sized and was found to have ice-melting properties as low as −35° C.

Example 6

A solution of 38% urea, 38% ammonium nitrate, 20% methanol and 4% water was prepared. Excellent ice-thawing capacity occurred at temperatures as low as −30° C., the lowest temperature tested.

Example 7

A solution of 34.5% urea, 28.5% ammonium nitrate, 34% methanol and 3% water was prepared. Excellent ice-thawing capacity occurred at temperatures as low as −30° C., the lowest temperature tested.

Examples 6 and 7 are illustrative of a preferred class of liquid thawing compositions which consist essentially of from about 30 percent to about 38 percent urea, from about 28 percent to about 47 percent ammonium nitrate, from about 34 percent to about 12 percent methanol and from about 3 to 12 percent water. These liquid thawing compositions are stable in storage, effective and substantially non-phytotoxic when employed for thawing ice on streets, sidewalks, driveways and other surfaces near vegetation.

Example 8

Solutions of from 20 percent to 65 percent anhydrous calcium nitrate in methanol were prepared. Excellent ice-thawing capacity occurred at temperatures as low as −30° C., the lowest temperature tested. These liquid compositions, if substantially anhydrous, may be unstable in storage. Addition of a very small percentage of water will prevent the formation of a solid precipitate on standing. It will be understood that addition of an excessive amount of water merely reduces the ice-thawing capacity of a given quantity of the composition.

To those skilled in the art there will be apparent other modifications and variations of the non-phytotoxic thawing compositions and method of this invention which may be practiced without departing from the spirit and scope thereof.

What is claimed is:

The method of thawing ice consisting of applying to the surface of ice a composition consisting essentially of from about 50 to about 96 percent by weight calcium nitrate, the remainder consisting of ammonium nitrate and not more than about 13 percent water.

References Cited by the Examiner

UNITED STATES PATENTS

| | | | |
|---|---|---|---|
| 2,038,724 | 3/1936 | Eichengrum | 252—71 |
| 2,979,463 | 3/1961 | Fergason | 252—70 |
| 2,980,620 | 3/1961 | Hatch | 252—70 |
| 3,185,648 | 5/1965 | Standish et al. | 252—70 |

SAMUEL H. BLECH, *Primary Examiner.*

JULIUS GREENWALD, ALBERT T. MEYERS,
*Examiners.*

J. D. WELSH, *Assistant Examiner.*